(12) United States Patent
Lee et al.

(10) Patent No.: US 8,673,053 B2
(45) Date of Patent: Mar. 18, 2014

(54) METHOD OF HARDENING AN INTERFACE OF CARBON MATERIAL USING NANO SILICON CARBIDE COATING

(75) Inventors: Young Hee Lee, Gyeonggi-do (KR); Kang Pyo So, Gyeonggi-do (KR); Eun Sun Kim, Gyeonggi-do (KR); Young Woo Park, Seoul (KR)

(73) Assignees: Research & Business Foundation of Sungkyunkwan University, Gyeonggi-do (KR); Dayou Smart Aluminum Co, Ltd., Gwangju (KR)

( * ) Notice: Subject to any disclaimer, the term of this patent is extended or adjusted under 35 U.S.C. 154(b) by 111 days.

(21) Appl. No.: 13/270,656

(22) Filed: Oct. 11, 2011

(65) Prior Publication Data
US 2012/0210823 A1 Aug. 23, 2012

(30) Foreign Application Priority Data
Feb. 22, 2011 (KR) ........................ 10-2011-0015577

(51) Int. Cl.
C22C 1/02 (2006.01)
H05B 6/02 (2006.01)
B02C 23/00 (2006.01)

(52) U.S. Cl.
USPC .......... 75/684; 75/686; 423/345; 204/157.45; 977/773

(58) Field of Classification Search
USPC .................... 75/686, 684; 423/345; 977/773; 204/157.45
See application file for complete search history.

(56) References Cited

U.S. PATENT DOCUMENTS

| | | | |
|---|---|---|---|
| 4,623,388 A * | 11/1986 | Jatkar et al. | 75/232 |
| 4,753,690 A | 6/1988 | Wada et al. | |
| 4,839,150 A * | 6/1989 | Coyle et al. | 423/345 |
| 5,080,715 A * | 1/1992 | Provencher et al. | 75/708 |
| 6,485,541 B1 * | 11/2002 | Hryn et al. | 75/709 |
| 6,699,450 B2 * | 3/2004 | Dunn et al. | 423/291 |
| 2001/0011059 A1 | 8/2001 | Dunn et al. | |
| 2003/0175543 A1 | 9/2003 | Lo | |
| 2004/0029706 A1 | 2/2004 | Barrera et al. | |
| 2008/0179782 A1 | 7/2008 | Liu et al. | |

FOREIGN PATENT DOCUMENTS

| | | |
|---|---|---|
| CN | 1487127 A * | 4/2004 |
| CN | 101125653 | 2/2008 |
| CN | 101125653 A * | 2/2008 |
| EP | 0130034 | 1/1985 |
| EP | 2072635 | 6/2009 |
| EP | 2202203 | 6/2010 |

(Continued)

OTHER PUBLICATIONS

Machine translation of CN 101125653A published Feb. 2008.*

(Continued)

*Primary Examiner* — George Wyszomierski
*Assistant Examiner* — Tima M McGuthry Banks
(74) *Attorney, Agent, or Firm* — Clement A. Berard, Esq.; Dann, Dorfman, Herrell & Skillman, PC

(57) ABSTRACT

Disclosed is a method for hardening an interface of a carbon material by using nano silicon carbide coating. A carbon material-aluminum composite prepared by the disclosed method is light in weight, and has a high dynamic strength, and thus can be applied to currently used cars and aluminum wheels. Furthermore, the composite can be utilized as a material for aircrafts, spacecraft, ships, etc. requiring a high strength.

8 Claims, 6 Drawing Sheets

(56) References Cited

FOREIGN PATENT DOCUMENTS

| | | | |
|---|---|---|---|
| JP | 62-167212 | | 7/1987 |
| JP | 2004161507 A | * | 6/2004 |
| JP | 2007-154246 | | 6/2007 |
| KR | 10-2005-0037877 | | 4/2005 |
| WO | 2010-090479 | | 8/2010 |

OTHER PUBLICATIONS

Machine translation of JP 2004161507A published Jun. 2004.*
Machine translation of CN 1487127A published Apr. 2004.*
CN 101125653 A by Du et al. Published Feb. 20, 2008. Abstract.*
JP 2004161507 A by Bando et al. Published Jun. 10, 2004. Abstract.*
CN 1487127 A by Tan et al. Published Apr. 7, 2004. Abstract.*
Korean Intellectual Property Office, "Notice to File a Response", KR Patent Application No. 10-2011-0015577, Jul. 30, 2012, 7 pages.
Feung-Lei Wang, et al., "SiC Nanowires Synthesized by Rapidly Heating a Mixture of SiO and Arc-Discharge Plasma Pretreated Carbon Black", Nanoscale Res. Lett. vol. 4, 2009, Nov. 22, 2008, pp. 153-156.
European Patent Office, "Communication—European Search Report", EP Patent Application No. 11174301.9, Jul. 5, 2012, 10 pages.
M. Gupta, et al., "Effect of Preparation Methods on the Incorporation/Distribution of Ceramic Particles in Metal Based Composite Powders", XP-002677567, Materials Transactions, JIM, vol. 36, No. 3, 1995, pp. 451-457.
Morsi, K. et al., "Effect of Mechanical Alloying Time and Carbon Nanotube (CNT) Content on the Evolution of Aluminum (AI)-CNT Composite Powders", J. Mater. Sci. (2007), vol. 42, pp. 4954-4959, © 2007, Springer Science+Business Media, LLC.
Gorrasi, Giuliana et al., "Incorporation of Carbon Nanotubes into Polyethylene by High Energy Ball Milling: Morphology and Physical Properties", J. Of Pol. Sci. Part B., Pol. Phys., 2007, vol. 45, Issue 5, pp. 597-606, © 2007, Wiley Periodicals, Inc.
Wikipedia, "Carbon Nanotube", Jul. 15, 2011, 26 pages, http://en.wikipedia.org/wiki/carbon_nanotube.
Torayca, "Carbon Fiber", © 2005, Toray Industries, Inc., 2 pages, http://www.torayca.com/properties/en/images/report_eng01_2.html.
So, Kang Pyo et al., "Nanoparticles Prepared Using Carbon Nanotube and Preparation Method Therefor", U.S. Appl. No. 13/147,890, filed Aug. 4, 2011, 46 pages.
European Patent Office, "Communication pursuant to Article 94(3) EPC", EP Patent Application No. 11174301.9, Nov. 1, 2013, 6 pages.
The State Intellectual Property Office of China, "First Office Action", CN Patent Application No. 201110245614.2, Nov. 4, 2013, 12 pages.
Japan Patent Office, "Office Action", JP Patent Application No. 2011-162867, Jun. 18, 2013, 6 pages.

* cited by examiner

Figure 12.

| Sample | Tensile st. (MPa) | Yield st. (MPa) | Young's Mod. (GPa) | Elongation (%) |
|---|---|---|---|---|
| RAW | 235 | 167 | 61 | 1.62 |
| 1wt% | 277 | 185 | 69 | 1.76 |

METHOD OF HARDENING AN INTERFACE OF CARBON MATERIAL USING NANO SILICON CARBIDE COATING

This Application claims the priority of Korean Application No. 10-2011-0015577 filed Feb. 22, 2011, which is hereby incorporated herein by reference in its entirety.

The present invention relates to a method for hardening an interface of a carbon material using nano silicon carbide coating.

Aluminum is used in everyday life for multiple purposes, from foil used in a kitchen to disposable tableware, windows, cars, aircrafts, spacecraft, etc. Aluminum is light in weight (about one-third the weight of iron), and has high strength by alloying with other metals. Also, aluminum is chemically stable because a chemically stable oxide film existing on an aluminum surface inhibits development of corrosion caused by moisture or oxygen, etc. Furthermore, aluminum has been used as a part material for cars, airplanes, etc. because its characteristic of having a lighter weight than conventional iron contributes to improving fuel efficiency. However, such aluminum has a tensile strength of about 40% when compared to iron. Accordingly, the use of aluminum as a structural material highly increases the thickness of a structural aluminum pipe or panel, and thus requires a large amount of material, thereby causing a problem in that an excessive material cost is required.

Meanwhile, a carbon nanotube has been conventionally known to have a high mechanical property due to its characteristic structure. A multi-walled carbon nanotube and a carbon fiber have a tensile strength of 63 GPa (See Wikipedia article, "Carbon Nanotube, viewable at en.wikipedia.org/wiki/Carbon_nanotube) and 3.5 GPa (Toray Industries, Inc.), respectively.

There have been suggested methods for preparing a high-strength carbon nanotube/aluminum composite material by using such a carbon nanotube. The preparation method includes: a powder metallurgical method in which aluminum or aluminum-alloy powder is mixed with carbon nanotube and is pressurized and heated; a semi-fusion stirring solidifying method in which a semi-fused aluminum alloy is continuously stirred while being added with a predetermined amount of carbon nanotube; and a melting/pressurizing impregnation method in which a molten aluminum alloy is impregnated with a porous preform, and is composited with pressurized carbon nanotube.

However, when these preparation methods are used, it is very difficult to uniformly disperse a carbon nanotube in an aluminum metal due to a high difference between specific gravities of the aluminum and the carbon nanotube. Also, when a melting/casting method is used for uniform dispersion, there is a problem in that a carbon material is decomposed due to a covalent bond between aluminum and carbon. In order to solve such a problem, there have been conducted various studies, such as a method for preparing a nanoparticle by using a carbon nanotube, and adjusting its size (Korean Patent Application No. 10-2010-0010573), a method for encapsulating a carbon material in aluminum, etc.

Accordingly, the present invention has been made to solve the above-mentioned problems occurring in the prior art. Specifically, a carbon material such as a carbon nanotube is coated with nano silicon carbide by using a ball mill and high frequency heat treatment. Furthermore, during a melting/casting process, an impeller stirring method is used to uniformly disperse a carbon material within the aluminum while inhibiting a covalent bond between the aluminum and the carbon material. This significantly improves a mechanical property of aluminum, compared to conventional aluminum.

SUMMARY

An object of the present invention is to provide a method for hardening an interface of a carbon material by coating nano silicon carbide on the carbon material.

Another object of the present invention is to provide a method for enhancing a mechanical strength of aluminum by using the carbon material.

A further object of the present invention is to provide an aluminum composite in which a carbon material with an enhanced mechanical strength is encapsulated.

To achieve the above object, the present invention provides a method for forming a Si—C covalent bond, the method including the steps of: (a) preparing a silicon-carbon material mixture by mixing a silicon nanoparticle with a carbon material; and (b) performing heat treatment by high frequency induction on the silicon-carbon material mixture.

In one aspect, the present invention provides a method for hardening an interface of a carbon material, the method including the steps of: (a) preparing a silicon-carbon material mixture by mixing a silicon nanoparticle with a carbon material; and (b) performing heat treatment by high frequency induction on the silicon-carbon material mixture.

In another aspect, the present invention provides a method for encapsulating a carbon material in aluminum, the method including the steps of: (a) preparing a silicon-carbon material mixture by mixing a silicon nanoparticle with the carbon material; (b) performing heat treatment by high frequency induction on the silicon-carbon material mixture to form a Si—C covalent bond; and (c) mixing the carbon material formed with the Si—C covalent bond, with aluminum, followed by ball-milling. The method may further include the step of adding aluminum to the aluminum mixed with the carbon material, followed by melting, so as to enhance a mechanical strength of the aluminum.

In the present invention, the carbon material may be selected from the group consisting of graphite, a graphite fiber, a carbon fiber, a carbon nano fiber, and a carbon nanotube, but the present invention is not limited thereto. It is known that a currently available carbon material has a diameter of 0.4 nm to 16 μm, and a length of 10 nm to 10 cm. Specifically, based on recently reported data (Science 292, 2462 (2001)), a carbon nanotube has a minimum diameter size of 0.4 nm, and a carbon fiber (a commercialized product) has a maximum diameter of 16 μm (Taiwan Carbon Technology Co). A multi-walled carbon nanotube used as a carbon material in the present invention has a diameter of 10 to 20 nm, and a length of 10 to 20 μm. However, the method according to the present invention is not limited to the above described sizes of a carbon material.

In the present invention, the silicon nanoparticle may be prepared by ball milling in order to adjust the size of a silicon powder. Herein, the mixing ratio of the silicon powder and the carbon material may range from 1 to 50 wt %. The silicon powder and the carbon material together with balls are introduced into a stainless steel vessel, and then ball-milled under an inert gas atmosphere. The ball milling may be carried out at 100 to 5000 rpm, for 1 to 10 hours. However, the method according to the present invention is not limited to the above described rpm and time.

In the present invention, the method for adjusting the size of silicon powder largely includes a milling step by balls, and a milling step by a carbon nanotube (Korean Patent Application 10-2009-0009366). FIG. 2 is a conceptual view illustrating the mechanism of the present invention. In order to realize the invention, as shown in FIG. 2a, a pulverizing step by balls during the ball milling has to be preceded. As the pulverizing step of powder particles by balls is advanced, the particles are generally welded together while not being further pulverized. For this reason, there is a limitation in reducing the size of particles through a milling method by a ball mill. Meanwhile, the use of a carbon nanotube can inhibit particles from being welded together. Furthermore, the carbon nanotube mills the particles. The conceptual view shown in FIG. 2b illustrates the mechanism where the carbon nanotube mills a micro-sized particle into nanosize particles.

In the present invention, "mixing" may indicate mixing by the ball mill, and the silicon-carbon material mixture may be ball-milled to uniformly mix silicon powder with an adjusted size with a carbon material. The mixing ratio of the silicon powder and the carbon material may range from 10 to 80 wt %. The silicon powder and the carbon material together with balls are introduced into a stainless steel vessel, and then ball-milled under an inert gas atmosphere. The ball milling may be carried out at 100 to 5000 rpm, for 1 minute to 2 hours. However, the method according to the present invention is not limited to the above described rpm and time.

In the present invention, in order to form a Si—C covalent bond in the silicon/carbon material mixture, heat treatment through a high frequency induction furnace may be carried out. The silicon/carbon material mixture is introduced into a graphite crucible and subjected to heat treatment by high frequency induction under a vacuum atmosphere. The heat treatment may be carried out at 900 to 1500° C. for 1 minute to 1 hour. However, the method according to the present invention is not limited to the above described temperature and time in the heat treatment.

In the present invention, in order to encapsulate a carbon material including a Si—C covalent bond in aluminum powder, ball milling may be carried out at 100 to 500 rpm, for 1 to 12 hours. However, the method according to the present invention is not limited to the above described rpm and time in ball mill.

In the present invention, additional aluminum may be further added to aluminum mixed with a carbon material (encapsulated in the aluminum), and dissolved at 500 to 700° C. for 1 to 3 hours, and then stirred by an impeller. The stirring may be carried out at 100 to 500 rpm, for 10 minute to 2 hours under a vacuum atmosphere.

In the present invention, the high frequency may range from 100 Hz to 400 kHz and specifically from 6 to 7 kHz.

Also, the present invention provides a carbon material-aluminum composite which has an enhanced mechanical strength of aluminum by the above described method.

The carbon material-aluminum composite prepared according to the present invention is light in weight, and has a high dynamic strength, and thus can be applied to currently used cars and aluminum wheels. Furthermore, the composite can be utilized as a material for aircraft, spacecraft, ships, etc. requiring a high strength.

BRIEF DESCRIPTION OF DRAWINGS

FIG. 12 shows a mechanical property measurement comparison of an interface-hardened carbon material/aluminum composite according to an embodiment of the present invention.

DESCRIPTION OF EXAMPLE EMBODIMENTS

Hereinafter, the configuration and technical characteristics of the present invention will be described in more detail with reference to Examples below. However, the following examples are illustrative only, and the scope of the present invention is not limited thereto. The contents of documents cited in the present invention are hereby incorporated by reference.

Example 1

Preparation of a Silicon Nanoparticle by Using a Carbon Nanotube

For adjustment of the size of silicon powder by ball milling, as a carbon nanotube, a multi-layered carbon nanotube with a thickness of 10 to 20 nm, and a length of 10 to 20 μm (Hanwha Nanotech, CM95) was used. Silicon powder was bought from Aldrich. The silicon powder and the carbon nanotube were introduced in a stainless steel ball mill jar (Taemyong science) made of SKD 11, and then purged by an inert gas (argon) to inhibit oxidation. The carbon nanotube was used in 30 wt %. For ball milling, milling was carried out at 300 rpm for 10 hours. Herein, a ball used for milling was a zirconia ball (Daehan, DH. ML 1032) having a diameter of 5 mm.

Figure 1:
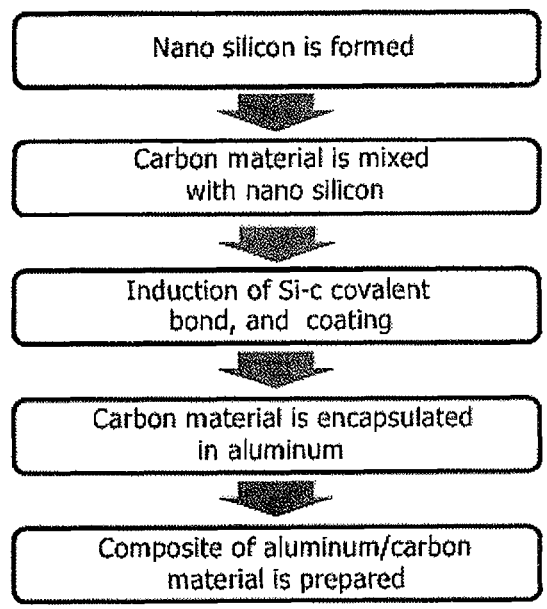
FIG. 1 is a flow chart for hardening interface of a carbon material by using silicon carbide coating so as to improve a mechanical property of aluminum, according to an embodiment of the present invention.
Figure 2:
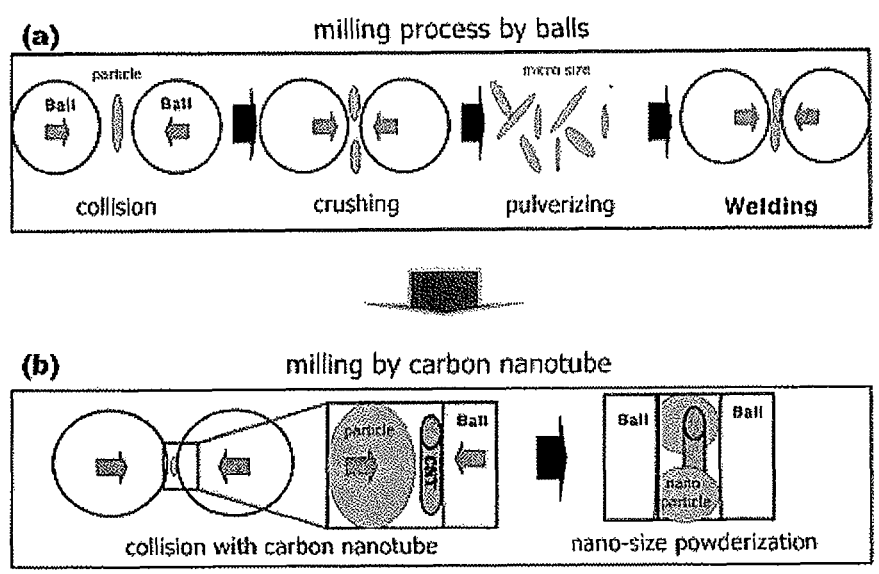
FIG. 2 is a conceptual view illustrating the mechanism in each step in a nanoparticle preparation method using a carbon nanotube, according to the present invention.
Figure 3:
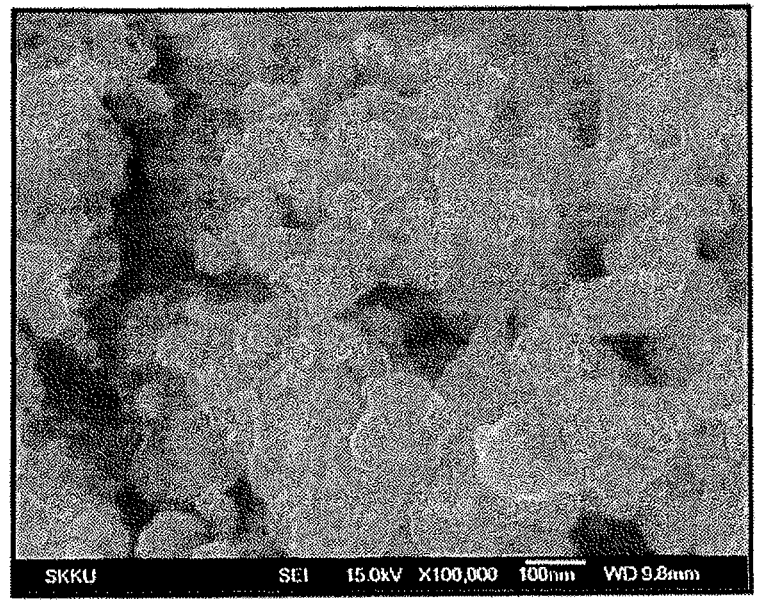
FIG. 3 is an electron microscopic photograph showing a state where silicon powder and a carbon nanotube were ball-milled for 10 hours, according to an embodiment of the present invention.

FIG. 3 is an electron microscopic photograph (JEOL, JSM7000F) of a silicon nanoparticle prepared by using a carbon nanotube, which is observed at 100,000× after 10 hour of ball milling. It can be seen that the silicon nanoparticle can be observed after 10-hour of milling.

Example 2

Uniformly Mixing Silicon Nano Powder with a Carbon Nanotube

Figure 4:
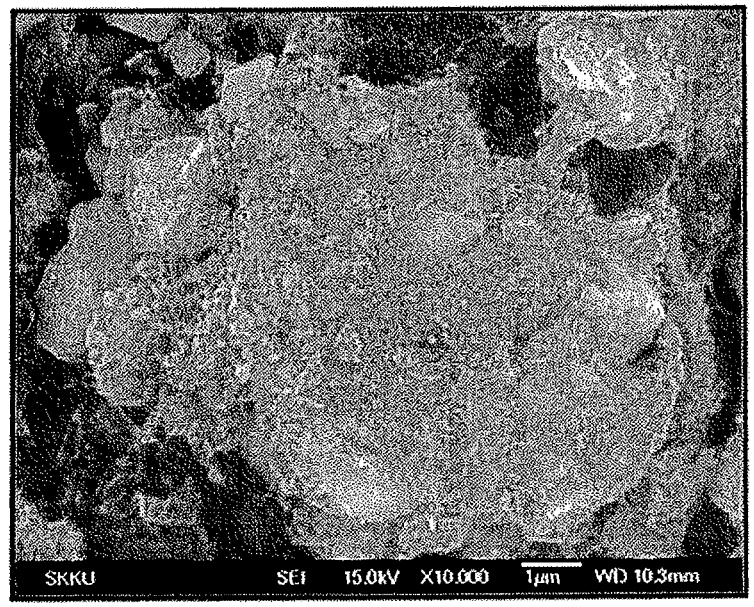
FIG. 4 is an electron microscopic photograph showing a state where silicon powder with an adjusted size and a carbon nanotube were ball-milled for 1 hour, according to an embodiment of the present invention.

The silicon nano powder prepared from Example 1, and carbon nanotube were introduced in a ball mill jar in ratios of 3:5, 6:5, 12:5, and 20:5, and then purged by an inert gas (argon) to inhibit oxidation. The ball millings were carried out at 230 rpm for 1 hour. FIG. 4 is an electron microscopic photograph observed at 10,000× after 1-hour of ball milling at a ratio of 6:5. It can be seen that the silicon nano powder and the carbon nanotube can be uniformly mixed.

Example 3

Figure 5:
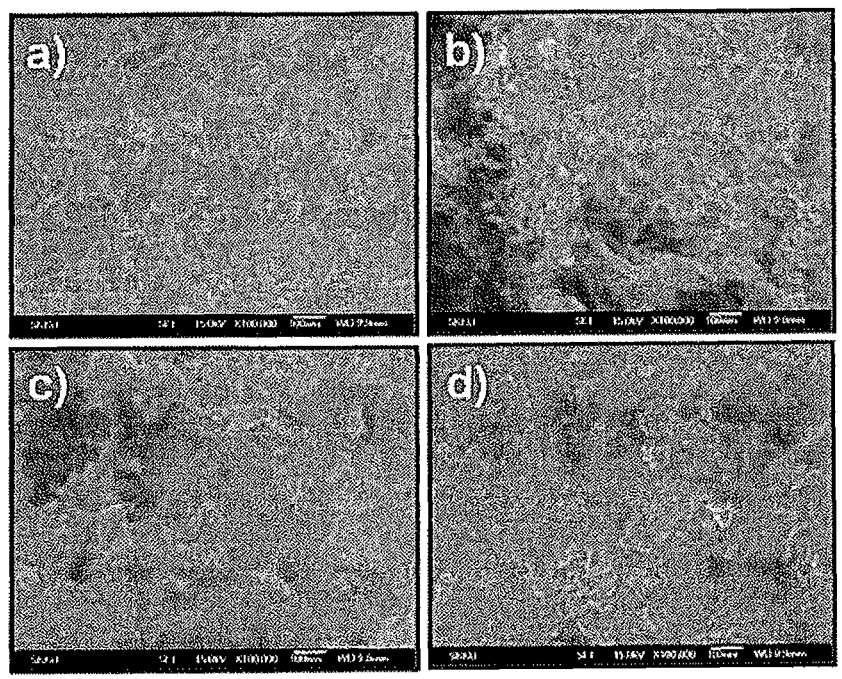
FIG. 5 is an electron microscopic photograph showing a state where a silicon-carbon nanotube mixture was subjected to heat treatment by high frequency induction at 1300° C. for 1 hour, according to an embodiment of the present invention.

Induction of an Si—C Covalent Bond and Coating Through a Heat Treatment by High Frequency Induction Each of the test samples mixed in Example 2 was introduced to a graphite crucible (Dongbang Carbon), and was subjected to a heat treatment at 1300° C. for 1 hour through a high frequency induction furnace (Eltek) under a vacuum. FIG. 5a is an electron microscopic photograph observed at 100,000× after heat treatment of silicon nano powder and carbon nanotube in a ratio of 3:5. FIGS. 5b, 5c, and 5d are electron microscopic photographs observed at 100,000× after heat treatment of silicon nano powder and carbon nanotube in ratios of 6:5, 12:5, and 20:5, respectively. It can be seen that the silicon nano powder was uniformly coated on the surface of the carbon nanotube.

Figure 6:
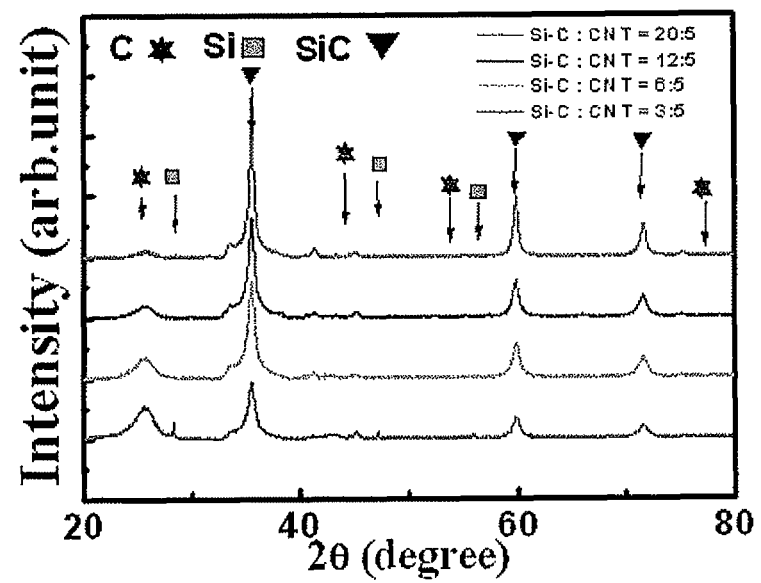
FIG. 6 is an x-ray diffraction analysis showing a state where a silicon-carbon nanotube mixture was subjected to heat treatment by high frequency induction at 1300° C. for 1 hour, according to an embodiment of the present invention.

FIG. 6 illustrates the analysis of an Si—C covalent bond, which was obtained by an x-ray diffractometer (BRUKER AXS/D8 FOCUS (2.2 KW), CuK α 1.54 Å). It can be seen that in all ratios (3:5, 6:5, 12:5, and 20:5), SiC obtained by a covalent bond of Si—C was formed.

Figure 7:
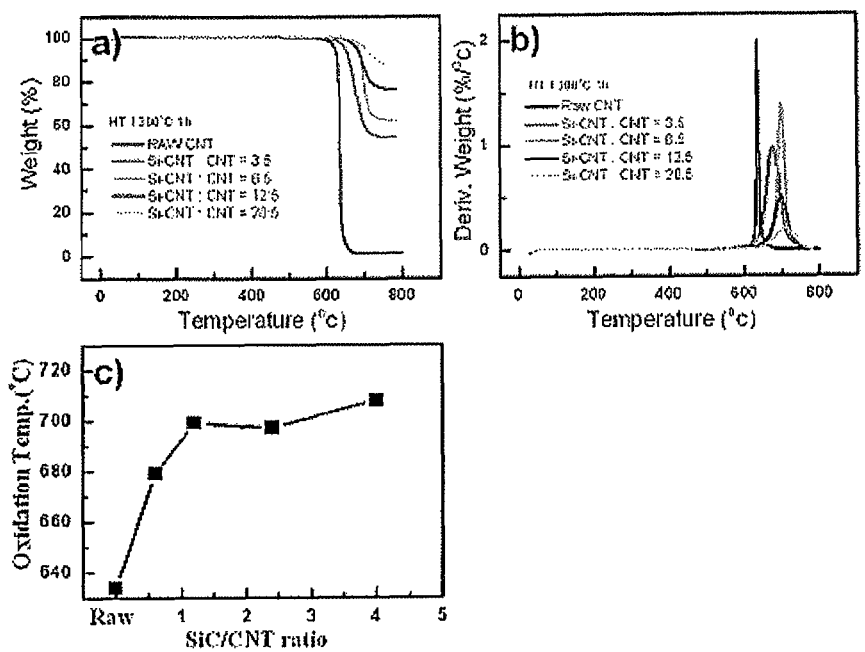
FIG. 7 is a thermal gravimetric analysis showing a state where a silicon-carbon nanotube mixture was subjected to heat treatment by high frequency induction at 1300° C. for 1 hour, according to an embodiment of the present invention.

As shown in FIG. 7, when heat treatment was carried out up to RT-800° C. in an oxidizing atmosphere, the oxidation temperature was measured by a thermal gravimetry analyzer (TGA). FIG. 7a shows a TGA temp/weight graph in respective ratios after the measurement. Raw CNT was the multi-layered carbon nanotube (Hanwha Nanotech, CM95) as used above. FIG. 7b shows a TGA Temp/Deriv. weight graph, which is a differentiated graph of FIG. 7a. In this graph, the highest peak indicates an oxidation temperature where oxidation was most actively carried out.

FIG. 7c shows a graph obtained by measuring the oxidation temperatures in FIG. 7b, according to concentrations. RAW CNT, which was not subjected to induction of Si—C covalent bond, and coating, shows an oxidation temperature of 635° C. In ratios of 3:5, 6:5, 12:5, and 20:5 of silicon nano powder and carbon nanotube, the oxidation temperatures were 679° C., 699° C., 697° C., and 708° C., respectively. From these results, it can be found that through induction of an Si—C covalent bond, and coating, the interface of a carbon material was hardened.

Example 4

Encapsulation of a Carbon Material by Aluminum

Figure 8:
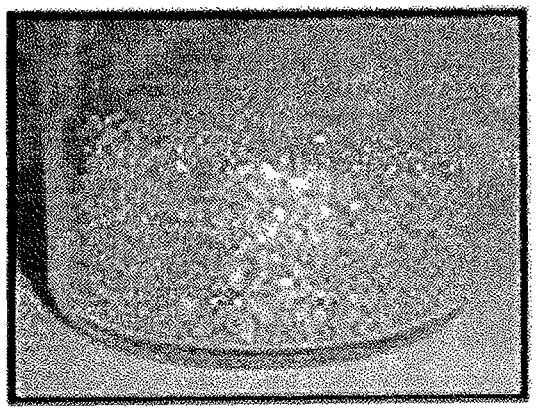
FIG. 8 is an optical photograph showing a state where a carbon material with a hardened interface (formed with a Si—C covalent bond) and aluminum were ball-milled for 6 hours, according to an embodiment of the present invention.

The carbon nanotube (6:5) as prepared above, which has an Si—C covalent bond and a coating, and aluminum powder were introduced to a ball mill jar and then purged by inert gas (argon) to inhibit oxidation of the aluminum. The ball milling was carried out at 230 rpm for 6 hours (Korean Patent Application 10-2007-0135267). Herein, the concentration of the carbon nanotube with the Si—C covalent bond and the coating was 5 wt %. FIG. 8 is a photograph obtained by a digital camera (Nikon, koolpix-3700) after ball milling. It can be seen that the carbon nanotube was encapsulated by aluminum.

Example 5

Further Addition of Aluminum to Aluminum Formed into a Capsule, Followed by Melting and Molding The aluminum formed into a capsule, including 5 wt % of carbon nanotube, which was prepared from Example 4, was molten and casted by an ALDC 12 aluminum ingot (Woosin metal co. ltd, KSD 2331) and impeller stirring, thereby providing an aluminum ingot including 1 wt % of carbon nanotube. The impeller was made of a graphite material, and the stirring was carried out at 500 rpm under a vacuum at 650 to 700° C. for 20 minutes.

Figure 9:
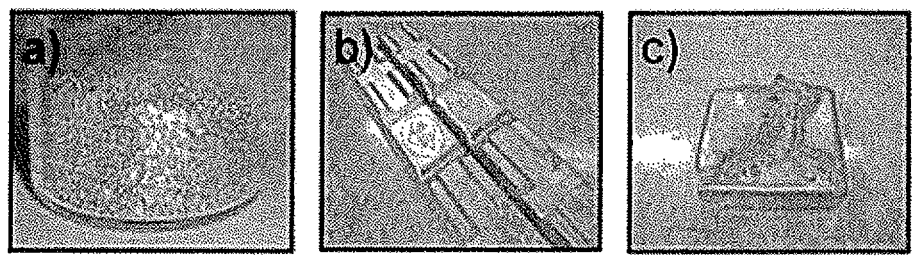
FIG. 9 shows optical photographs of test samples in an aluminum mechanical property improving process using an interface-hardened carbon material, according to an embodiment of the present invention.

FIG. 9a shows an aluminum capsule prepared from Example 4, FIG. 9b shows an ALDC 12 ingot, and FIG. 9C shows a 1 wt % carbon nanotube-aluminum ingot prepared by impeller stirring.

Figure 10:
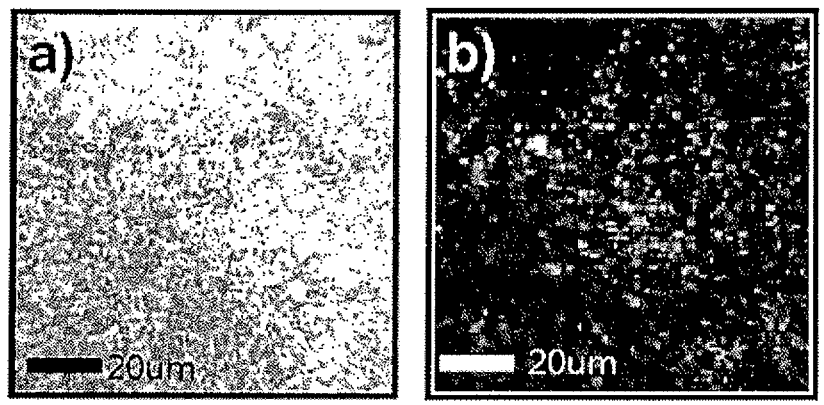
FIG. 10 shows a confocal Raman analysis illustrating the distribution of a carbon nanotube according to an embodiment of the present invention.

In order to observe the distribution of carbon nanotube, a confocal Raman was used for measurement. FIG. 10a shows an optical photograph, and FIG. 10b shows a mapped result of a Raman peak of a carbon nanotube, corresponding to the optical photograph. From the result of the analysis of FIG. 10b, it can be found that the carbon nanotube was uniformly dispersed.

In order to measure a mechanical property, a test piece was obtained through die-casting, and then was subjected to a tensile test by using a UTM device.

Figure 11:
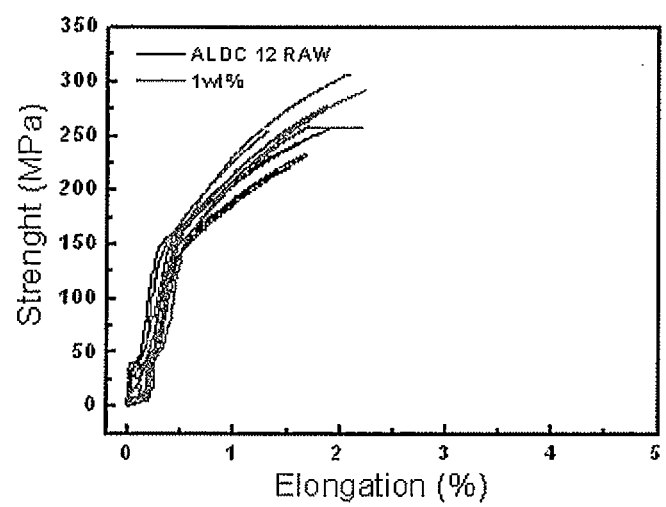
FIG. 11 is a graph showing a mechanical property of an interface-hardened carbon material/aluminum composite according to an embodiment of the present invention.

FIG. 11 is a graph showing the tensile test result of RAW (ALDC 12) and 1 wt % of carbon nanotube-aluminum. FIG. 12 shows the result values of the tensile test. The RAW test piece showed a tensile strength of 235 MPa, a yield strength of 167 MPa, a young's modulus of 61 GPa, and an elongation of 1.62%. 1 wt % of carbon nanotube-aluminum showed a tensile strength of 277 MPa, a yield strength of 185 MPa, a young's modulus of 69 GPa, and an elongation of 1.76%. The carbon nanotube interface-hardened by the Si—C covalent bond and the coating has increased mechanical properties, such as a tensile strength of 18%, a yield strength of 11%, a young's modulus of 13%, and an elongation of 9%, compared to RAW.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A method for enhancing a mechanical strength of aluminum, the method comprising the steps of:
    (a) preparing a silicon-carbon material mixture by mixing a silicon nanoparticle with a carbon material;
    (b) performing heat treatment by high frequency induction on the silicon-carbon material mixture to form a Si—C covalent bond;
    (c) encapsulating the carbon material in aluminum by mixing the carbon material formed with the Si—C covalent bond with the aluminum, followed by ball milling; and (d) further adding aluminum to the aluminum mixed with the carbon material, followed by melting.

2. The method as claimed in claim 1, wherein the carbon material is at least one selected from the group consisting of graphite, a graphite fiber, a carbon fiber, a carbon nano fiber, and a carbon nanotube.

3. The method as claimed in claim 1, wherein the carbon material has a diameter of 0.4 nm to 16 μm, and a length of 10 nm to 10 cm.

4. The method as claimed in claim 1, wherein the silicon nanoparticle is prepared by ball milling.

5. The method as claimed in claim 1, wherein the silicon-carbon material mixture is mixed by ball milling.

6. The method as claimed in claim 1, wherein the carbon material formed with the Si—C covalent bond is formed by the heat treatment by high frequency induction.

7. The method as claimed in claim 1, wherein the aluminum mixed with the carbon material is formed into a capsule by ball milling.

8. The method as claimed in claim 1, wherein the high frequency ranges from 100 Hz to 400 kHz.

* * * * *